United States Patent [19]

Thompson

[11] 4,094,698

[45] June 13, 1978

[54] DYE OR COLOR DEVELOPING INORGANIC PIGMENTS

[75] Inventor: Thomas D. Thompson, Flemington, N.J.

[73] Assignee: Yara Engineering Corporation, Elizabeth, N.J.

[21] Appl. No.: 506,103

[22] Filed: Sep. 16, 1974

[51] Int. Cl.$^2$ ............................................. C04B 31/00
[52] U.S. Cl. ................................... 106/288 B; 106/72; 106/308 B; 252/450; 252/454; 427/215; 427/309; 427/399
[58] Field of Search ................... 106/288 B, 308 B, 72; 427/215, 309, 399; 252/454, 450

[56] References Cited

U.S. PATENT DOCUMENTS

| | | | |
|---|---|---|---|
| 1,650,022 | 11/1927 | Mahler et al. | 106/288 B |
| 3,219,592 | 11/1965 | Hirschler | 252/454 |
| 3,414,422 | 12/1968 | Iannicelli et al. | 106/288 B |
| 3,691,099 | 9/1972 | Young | 252/450 |

FOREIGN PATENT DOCUMENTS

| | | | |
|---|---|---|---|
| 780,254 | 3/1968 | Canada. | |
| 815,924 | 7/1959 | United Kingdom | 106/72 |
| 338,726 | 11/1930 | United Kingdom | 106/72 |

OTHER PUBLICATIONS

References cited here but not used in this action are included in that A, B+L teach acid treatment of clay, while M teaches coating clay with a slightly soluble salt.

*Primary Examiner*—Winston A. Douglas
*Assistant Examiner*—John P. Sheehan
*Attorney, Agent, or Firm*—Buell, Benko & Ziesenheim

[57] ABSTRACT

An oxidizing clay for pressure sensitive record materials is provided by treating an acid leached clay with cupric salts.

10 Claims, No Drawings

DYE OR COLOR DEVELOPING INORGANIC PIGMENTS

This invention relates to dye or color developing inorganic pigments and particularly to an improved oxidizing clay produced from bentonite.

The use of alumino-silicates in pressure sensitive record materials is well known. Typical of the various patents relating to this subject are, U.S. Pat. Nos. 3,455,721; 2,712,507; 2,730,456; 3,226,252; 3,293,060; and Canadian Pat. No. 780,254.

The pressure sensitive record materials are frequently termed "carbonless carbon papers" and are based upon use of oxidizing clays which react with another chemical to produce a colored product.

I have found that the oxidizing capacity of clays as well as their reactivity can be markedly enhanced. I have discovered first that by controlling leaching time, the oxidizing capacity of a clay can be varied. Secondly, I have found that the addition of cupric ions in the form of a cupric salt to acid leached bentonites will markedly improve their activity for pressure sensitive record materials and that the amount of cupric ion picked up will vary depending upon leaching time. For example, I have found that the most active clay, as determined by the oxidation of leuco methylene blue, was found to be the 4 hour leached sample, exchanged with cupric ion. The most reactive, non-exchanged clay was found to be the 16 hour leached material. The reactivity of pigment towards aniline (converting aniline to aniline black) was found to be highest on the bentonite which had been acid leached for four hours and exchanged with cupric ion.

The subject matter of this invention can, however, best be understood by reference to the following examples:

EXAMPLE I

Two hundred grams of bentonite was added to a solution of $H_2SO_4$ and water (200 g. $H_2SO_4$ in 800 ml. $H_2O$). This mixture was then heated at 90° C. for a period of 4 hours, after which the slurry was then filtered. The filter cake was then reslurried and 12 g. of $CuCl_2$ was added and the slurry was allowed to stir for 15-30 minutes. The Cu(II) saturated clay was then filtered, rinsed, and dried at 105° C.

EXAMPLE 2

One gram of the material prepared in Example 1 was weighed out in a watchglass and 2.0 ml. of a 1% solution of leuco methylene blue in xylene was added and allowed to stand exposed to the air for 24 hours and the intensity of the color was compared visually among the various samples. The results appear as item 12 on Table I.

Other color reactive materials were incorporated into the clay and color intensity was compared using xylene and DBP as solvent. The results appear in Table I.

TABLE I

| Compound | Solvent | Acid Activated Bentonite (after 72 hours in dark) | Oxidizing Clay Cu(II) Acid Activated Bentonite |
| --- | --- | --- | --- |
| 1. m-phenylenediamine | xylene | light brown | pink few seconds, dark red 10 minutes |
|  | DBP | light brown | dark brown few minutes, black-brown 10 minutes |
| 2. p-phenylenediamine | xylene | green | light green ca. 10 minutes |
|  | DBP | green fringe, light brown center with black specks | dark green ca. 10 minutes dark blue after 72 hours |
| 3. o-phenylenediamine | xylene | light pink | pink, 10 minutes |
|  | DBP | light pink, brown center | light brown, 10 minutes |
| 4. p-nitroaniline | xylene | light yellow initially and 72 hours | light yellow few seconds and 10 minutes |
|  | DBP | light yellow initially and 72 hours | light yellow-green 10 minutes |
| 5. p-aminophenol | xylene | very faint yellow | no color |
|  | DBP | pale violet | very pale brown |
| 6. bis-cyanoethyl aniline | xylene | yellow | yellow, 10 minutes |
|  | DBP | light blue center, yellow fringe | light green, 10 minutes |
| 7. m-diethylamino phenol | xylene | light brown | gray, 10 minutes |
|  | DBP | gray | slight gray, 10 minutes |
| 8. aniline |  | pink | black with green rim ca. 10 minutes |
| 9. N,N dimethylaniline |  | no color | light green, 10 minutes (dark blue after 1 week) |
| 10. N,N diethylaniline |  | no color | dark blue, 10 minutes (dark green after 1 week) |
| 11. m-choroaniline |  | very pale yellow with pink fringe | dark gray, 10 minutes |
| 12. leuco methylene blue |  | dark blue | dark blue, 10 minutes |

The same results are obtained using montmorillonite for bentonite.

It can be seen fron the foregoing test data that the materials of this invention using cupric ion exchange produce more intense colors in shorter times than do oxidized clays alone. This is, of course, highly desirable.

In the foregoing specification I have illustrated and described certain preferred embodiments and practices of my invention, however, it will be understood that this invention may be otherwise embodied within the scope of the following claims.

I claim:

1. An oxidizing clay for pressure sensitive record materials comprising an acid leached clay from the group consisting of bentonite and montmorillonite carrying ion exchanged cupric ions.

2. An oxidizing clay as claimed in claim 1 wherein the clay is bentonite.

3. An oxidizing clay as claimed in claim 1 wherein the clay is montmorillonite.

4. An oxidizing clay as claimed in claim 1 wherein the acid leached clay is exchanged with cupric ions from $CuCl_2$.

5. An oxidizing clay as claimed in claim 4 wherein the cupric chloride constitutes about 1% to 6% by weight of the clay.

6. An oxidizing clay as claimed in claim 1 wherein the clay has been leached for about 4 hours with sulfuric acid.

7. The method of producing an oxidizing clay for pressure sensitive record materials comprising the steps of (a) leaching a selected clay from the group bentonite and montmorillonite with mineral acid, and
(b) affixing cupric ions to the exchange sites of the treated clay by ion exchange.

8. The method as claimed in claim 7 wherein the cupric ions amount to about 0.5 to 1.6%.

9. A pressure sensitive record material comprising an acid leached clay having attached thereto ion exchanged cupric ions.

10. A pressure sensitive record material as claimed in claim 9 wherein the clay is bentonite.

* * * * *

UNITED STATES PATENT OFFICE
CERTIFICATE OF CORRECTION

Patent No. 4,094,698                         Dated  June 13, 1978

Inventor(s)  Thomas D. Thompson

It is certified that error appears in the above-identified patent and that said Letters Patent are hereby corrected as shown below:

On the title page, after "*Attorney, Agent, or Firm*", "Buell, Benko" should read --Buell, Blenko--.

Table I, No. 11, "m-choroaniline" should read --m-chloroaniline--.

Column 2, line 48, "fron" should be --from--.

Signed and Sealed this

Third Day of July 1979

[SEAL]

Attest:

Attesting Officer

LUTRELLE F. PARKER

Acting Commissioner of Patents and Trademarks